Jan. 4, 1966 H. G. KRANE 3,227,647
SEPARATION PROCESS
Filed Aug. 8, 1960 2 Sheets-Sheet 2
*Fig. II*
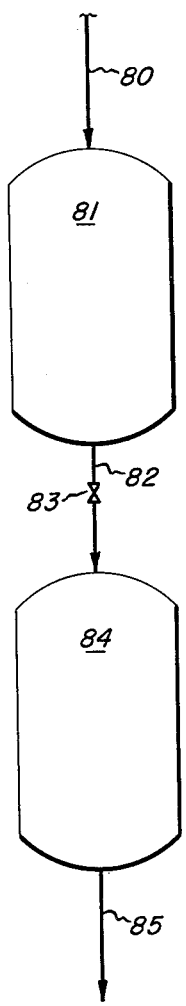
INVENTOR.
Herbert G. Krane
BY
*ATTORNEY*

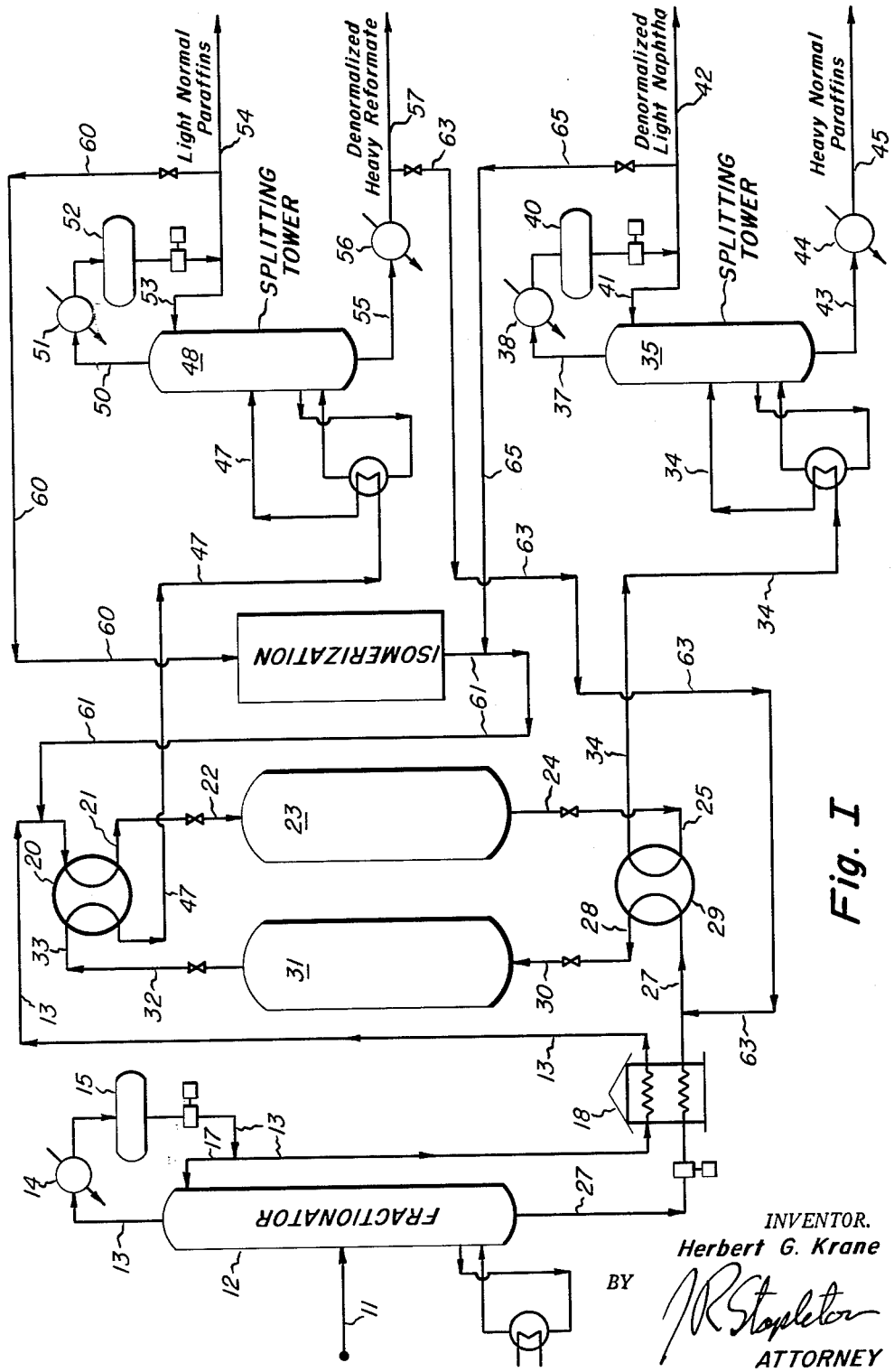
Fig. I

# United States Patent Office 3,227,647
Patented Jan. 4, 1966

3,227,647
SEPARATION PROCESS
Herbert G. Krane, Gary, Ind., assignor to Standard Oil Company, Chicago, Ill., a corporation of Indiana
Filed Aug. 8, 1960, Ser. No. 48,101
12 Claims. (Cl. 208—310)

This invention relates to the separation of straight-chain hydrocarbons from mixtures containing straight-chain hydrocarbons and nonstraight-chain hydrocarbons using a molecular sieve adsorbent material. More particularly, this invention relates to separation of straight-chain hydrocarbons from different boiling feed materials by adsorption and desorption using a molecular sieve adsorbent.

Molecular sieve adsorbents are excellent adsorber materials for the separation of straight-chain hydrocarbons from hydrocarbon feed materials. The molecular sieve adsorbents have a high selectivity for straight-chain hydrocarbons because the greater area of adsorbtive surface of the molecular sieve adsorbent is exposed only through small pore sizes through which only the straight-chain hydrocarbons are permitted to pass due to their molecular configuration. Thus, molecular sieve materials may permit admission of straight-chain hydrocarbons to the greater adsorption surfaces while excluding nonstraight-chain hydrocarbons such as branched-chain hydrocarbons, cyclo aliphatic hydrocarbons, aromatic hydrocarbons and the like.

Separation with molecular sieves is generally conducted in at least two cycles. The first cycle is adsorption of the straight-chain hydrocarbons on the molecular sieve adsorbent with removal of nonstraight-chain hydrocarbons from the vicinity of the adsorbent. The second cycle is desorption of the adsorbed straight-chain hydrocarbons from the molecular sieve material. Desorption has been accomplished using extraneous purge gases to strip the molecular sieve material of straight-chain hydrocarbons which are then separated from the purge gas. However, usually such purging is conducted at higher than adsorption temperature and the molecular sieve material should be cooled for maximum efficiency for use as an adsorbent. Also, such purging or stripping requires the use of extraneous purging gas and separation of purging gas from the straight-chain hydrocarbons after the purging operation.

Another method of desorbing during separation with molecular sieve adsorbents is by subjecting the molecular sieve material after adsorption to a vacuum whereby the vapor pressure of the adsorbed straight-chain hydrocarbons within the molecular sieve material is reduced and the straight-chain hydrocarbons are thereby desorbed and removed from the sieve. However, this desorption technique requires the use of an extraneous vacuum.

I have now provided a process for separation with molecular sieve adsorbents wherein desorption is accomplished with a stripping gas produced within the molecular sieve material itself. In a preferred embodiment, I have further provided such a process wherein the use of extraneous vacuum is eliminated by employing a pressure drop across the bed which pressure drop may be created within the system. My present invention is concerned with a separation process for separating straight-chain hydrocarbons and nonstraight-chain hydrocarbons using as an adsorbent material, a bed of molecular sieve adsorbent material having two opposing ends. In accordance herewith, a portion of a first hydrocarbon feed material containing straight-chain hydrocarbons and nonstraight-chain hydrocarbons is passed through the molecular sieve bed from a first end of the bed; straight-chain hydrocarbons are adsorbed from the first feed material on the molecular sieve material. The nonstraight-chain hydrocarbons of the first feed pass through the bed and are withdrawn from the second end of the bed. A portion of a second hydrocarbon feed material containing straight-chain hydrocarbons and nonstraight-chain hydrocarbons is then passed through the bed from the second end of the bed. The second feed material is such that the straight-chain hydrocarbons contained therein differ in boiling range from the nonstraight-chain hydrocarbons of the first feed and the nonstraight-chain hydrocarbons contained therein differ in boiling range from the straight-chain hydrocarbons of the first feed. Straight-chain hydrocarbons of the second feed are adsorbed on the molecular sieve material and the nonstraight-chain hydrocarbons of the second feed pass through the bed and strip the adsorbed straight-chain hydrocarbons of the first feed from the first end of the bed. A mixture of nonstraight-chain hydrocarbons from the second feed and straight-chain hydrocarbons from the first feed is recovered from the first end of the bed as a first product mixture. Another portion of the first feed is charged through the bed from the first end of the bed and there is recovered from the second end of the bed a second product mixture of non-straight-chain hydrocarbons from the first feed and straight-chain hydrocarbons from the second feed. The straight-chain hydrocarbons from the second feed have been stripped from the bed by the nonstraight-chain hydrocarbons of the first feed passing through the bed. The first product mixture may be separated into a first product of increased first feed straight-chain hydrocarbon content relative to said first feed and a second product of increased second feed nonstraight-chain hydrocarbon content relative to said second feed. The second product mixture may be separated into a third product of increased second feed straight-chain hydrocarbon content relative to said second feed and a fourth product of increased first feed nonstraight-chain hydrocarbon content relative to said first feed.

The first and second feeds are alternatingly charged to the bed as described above and the product mixtures are alternatingly withdrawn from the bed in cyclic operation. Each charging of first feed is followed by a charging of second feed which is in turn followed by a charging of first feed, etc.

As used herein for purpose of further explanation, the term "pair of chargings" will refer to a total of two chargings which include a charging of one feed and the next subsequent charging of the other feed. Neither feed in any one charging through the sieve is used in an amount sufficient to saturate the sieve with adsorbed straight-chain hydrocarbons. Additionally, the total amount of feeds used in any pair of chargings is less than that sufficient to saturate the sieve material with adsorbed straight-chain hydrocarbons. It follows that one end of the sieve is used for adsorbing from one feed and the other end of the sieve is used for adsorbing from the other feed.

In a preferred continuous embodiment, a plurality of beds of molecular sieves is employed in alternating parallel flow so that both feeds may be continuously charged to molecular sieve material by diverting the feeds alternatingly back and forth between two or more beds. Thus, while adsorption of straight-chain hydrocarbons from one feed with resulting desorption of the adsorbed straight-chain hydrocarbons from the other feed is taking place in one bed, the other feed, being charged to the other bed, is undergoing adsorption and is desorbing the straight-chain hydrocarbons previously adsorbed on the other bed from the one feed.

In all cases, the unadsorbed hydrocarbons passing through the bed, i.e., the nonstraight-chain hydrocarbons, act as a stripping medium to strip adsorbed straight-chain hydrocarbons from the other end of the bed and carry them from the bed.

In adsorption with molecular sieves, it is known that the hydrocarbons being adsorbed are adsorbed in higher concentrations at the inlet end of the bed. This permits the simultaneous adsorption and desorption in the present invention in that as a feed progresses through the bed substantially all straight-chain hydrocarbons are adsorbed therefrom before the bed is contacted with adsorbed hydrocarbons at the outlet end of the bed. The adsorbed hydrocarbons at the outlet end of the bed were adsorbed from a different feed formely charged to the outlet end of the bed, i.e., using the outlet end of the bed as the former inlet. The nonstraight-chain hydrocarobns are thus able to strip the adsorbed straight-chain hydrocarbons from the outlet end of the bed and carry them from the bed.

In each charging of feed, sufficient nonstraight-chain hydrocarbons are charged to the bed as a component in the feed to provide a sufficient amount of unadsorbed nonstraight-chain hydrocarbons passing through the bed to strip the adsorbed hydrocarbons concentrated at the other end. Thus, where one feed has a high concentration of straight-chain hydrocarbons the other feed may advantageously have a low concentration of straight-chain hydrocarbons, the other feed will also contain sufficient nonstraight-chain hydrocarbons to strip the straight-chain hydrocarbons of one feed which are adsorbed on the molecular sieve material. Conversely, the lower concentration of nonstraight-chain hydrocarbons in the one feed is sufficient to strip from the sieve the smaller amounts of straight-chain hydrocarbons adsorbed on the sieve from said other feed. It follows that the feed with the higher percentage of straight-chain hydrocarbons will use most of the bed for adsorption and will strip adsorbed hydrocarbons from a smaller portion of the bed and the feed with the lower percentage of straight-chain hydrocarbons will use a lesser amount of bed for adsorption and will strip adsorbed hydrocarbons from a greater portion of the bed. In each case, sufficient nonstraight-chain hydrocarbons are present for the stripping operation.

The total adsorbable straight-chain hydrocarbons of each pair of feed chargings, i.e., the total amount of staright-chain hydrocarbons in both feeds charging in each pair of feed chargings, should be less than the total adsorbtive capacity of the bed. This safeguard eliminates undue product contamination.

The process of this invention is particularily useful where it is desired to separate components from two feeds which boil in different boiling ranges. As has been seen above, the nonstraight-chain hydrocarbons are used to strip the straight-chain hydrocarbons from the bed. However, it has been known that for stripping, and especially in an isothermal process such as is contemplated in the preferred operation herein, it is desirable to employ a greater amount of stripping agent than the amount of adsorbed hydrocarbons. Thus, in this process and with reference to use of a heavy feed and light feed as an example, the volume ratio of nonstraight-chain hydrocarbons in the heavy or first feed to straight-chain hydrocarbons in the light or second feed is preferably at least about 3:1. Conversely, the volume ratio of nonstraight-chain hydrocarbons of the light or second feed to straight-chain hydrocarbons of the heavy or first feed is preferably at least about 3:1. It follows that the amount or volume of molecular sieve bed used for adsorption of each feed is advantageously balanced with respect to the feed composition at the time the feed composition enters the sieve. If either feed is lacking in the desired amount of nonstraight-chain hydrocarbons as it enters the sieve, the feed may be supplemented with additional corresponding nonstraight-chain hydrocarbons from recovered product as will be more evident herein below.

As another preferred embodiment of this invention, a pressure drop is provided within the sieve material between the zone of adsorption from a given feed and the zone of description with nonstraight-chain hydrocarbons from that given feed. This invention also provides an apparatus in which such pressure drop technique may advantageously be employed. The apparatus comprises two beds of molecular sieve material each contained in a chamber and each having two opposing ends. Each opposing end of each bed has a conduit communicating within the chamber for charging feed and removing stripped hydrocarbons. The two molecular sieve beds are connected in series flow by a conduit having a pressure drop valve. The pressure drop valve in the conduit permits adsorption in one bed at higher pressure than the stripping in the other bed and thereby supplements stripping by reducing the vapor pressure of adsorbed hydrocarbons in the bed undergoing stripping. The two beds of this embodiment so connected in series are useable in the process of this invention as an entity in substitution for one bed in the process flow.

FIGURE I illustrates a flow diagram of an embodiment of this invention.

FIGURE II illustrates a combination of two molecular sieve adsorbent beds for use in the preferred pressure drop embodiment of this invention. Flow through this combination is also illustrated.

With reference to FIGURE I and as an illustrative embodiment of this process of this invention, a mixture of light naphtha and total reformate is charged through at a rate of 17,000 bbls./day through line 11 to fractionator 12 wherein it is fractionated into a light overhead $C_{6-}$ fraction and a heavy bottom $C_{7+}$ fraction. The overhead fraction is withdrawn through line 13 condensed in condenser 14 and passed through reflux drum 15. The overhead fraction is taken at a rate of 6,800 bbls./day and contains 2,970 bbls./day of normal pentane and normal hexane and 3,830 bbls./day of nonstraight-chain $C_{6-}$ hydrocarbons including isopentane, isohexane, and small amounts of cyclic compounds. A portion of the overhead may be returned through line 17 as reflux. The remainder constitutes one of the feeds for use in the molecular sieve separation stage and is charged through furnace 18, line 13, switch valve 20, line 21 and line 22 from whence it is passed through molecular sieve bed 23. Molecular sieve bed 23 is a bed of Linde Molecular Sieve Type 5A. This sieve material has a pore size of about 5 A. and permits selective adsorption of straight-chain hydrocarbons. Then normal pentane and normal hexane are adsorbed on the upper end of bed 23 and nonstraight-chain hydrocarbons pass through the bed and are recovered in line 24, passed through line 25, switch valve 29, and line 34 to splitting tower 35. At the same time, the bottoms fraction from fractionator 12 is recovered in line 27, charged through furnace 18, valve switch 29, line 28 and line 30 to molecular sieve bed 31. The bottoms fraction is taken at 10,200 bbls./day and includes 940 bbls./day of straight-chain $C_{7+}$ hydrocarbons and 9,260 bbls./day of nonstraight-chain $C_{7+}$ hydrocarbons including isoparaffins and cyclic hydrocarbons. Molecular sieve bed 31 is Linde Molecular Sieve Type 5A. The heavy fraction passes through bed 31 and the straight-chain hydrocarbons are adsorbed at the bottom or inlet end of the bed while nonstraight-chain hydrocarbons pass therethrough, are recovered in line 32 and are passed through line 33, switch valve 20, and line 47 to splitting tower 48. The bottoms fraction from fractionator 12 thus constitutes the second feed in this process. Both feeds are charged to the respective molecular sieve beds in the vapor phase.

After operation in the above described flow for a brief processing period, i.e., about 12 minutes, whereby sufficient adsorption of hydrocarbons takes place within the molecular sieve beds at the above indicated ends of the beds, switch valve 20 and switch valve 29 are both turned to the position indicated by the dotted lines. The overhead fraction in line 13 is thereby diverted to the upper end of molecular sieve bed 31 through lines 33 and 32 and the bottoms fraction from line 27 is diverted through lines 25 and 24 to molecular sieve bed 23. The overhead fraction passes downwardly through bed 31 and normal pentane and normal hexane are adsorbed at the upper end of the bed. As the unadsorbed nonstraight-chain hydrocarbons pass downwardly through the bed, they strip the previously adsorbed C₇₊ straight-chain hydrocarbons from the lower end of the bed, carry them out through line 30, line 28, switch valve 39 and line 34 to splitting tower 35. As the heavy fraction passes upwardly through bed 23, the C₇₊ straight-chain hydrocarbons are adsorbed at the lower end of the bed and the nonstraight-chain hydrocarbons strip the previously adsorbed normal pentane and normal hexane from the upper end of the bed and carry them out through line 22, line 21, switch valve 20 and line 47 to splitting tower 48.

In splitting tower 35, the effluent from the molecular sieve beds containing stripping agent and stripped heavy normal paraffins is split in two fractions. The overhead fraction is recovered as denormalized light naphtha at a rate of 3,600 bbls./day and is cooled in condenser 38, passed through reflux drum 40 and discharged as product through line 42. A portion of the product may be refluxed through line 41. The bottoms fraction recovered through line 43 is heavy normal paraffins containing some aromatic contaminants. The bottoms fraction is cooled in cooler 44 and discharged as product through line 45.

The effluent from the molecular sieve beds containing light normal paraffins and denormalized heavy reformate is discharged to splitting tower 48 and split into two fractions. The overhead fraction consisting of light normal paraffins is recovered, condensed and discharged through line 54 at a rate of 3,150 bbls./day while the bottoms fraction consisting of denormalized heavy reformate is cooled and discharged through line 57 at a rate of 8,900 bbls./day.

Where it is desired to include more nonstraight-chain hydrocarbons in the light fraction in line 13 for more complete stripping of the molecular sieve beds, denormalized light naphtha may be recycled from line 42 through lines 65 and 61 to line 13. Alternatively, light normal paraffins from line 54 may be charged through line 60, isomerized in an isomerization reaction zone, and returned to line 13 via line 61. Suitable isomerization reactions are well known to those having ordinary skill in the art; for example, see the process described by J. K. Roberts, U.S. 2,433,482, issued December 30, 1947. Where it is desired to increase the amount of nonstraight-chain hydrocarbons in the bottoms fraction from fractionator 12 for use as a feed to the molecular sieve beds, denormalized heavy reformate may be recycled from line 57 through line 63 to line 27.

In the operation of the illustrated flow, valve switches 20 and 29 are intermittently switched to alternatingly direct the two different feeds through the two adsorbent beds for continuous adsorption-desorption operation and products are continuously withdrawn from lines 42, 45, 54 and 57. The cycle length in time will, of course, depend upon the size of the molecular sieve bed and the rate of feed flow. Calculation of time cycles is well within the engineering skill of those in the art.

The process produces useful products. The denormalized products, i.e., those withdrawn from lines 42 and 57, may be blended together to form a high-octane blending stock. The light normal paraffin product in line 54 may be used as feed for an isomerization unit. The heavy normal paraffins removed through line 45 can be catalytically reformed or blended into feed or distillate fuel.

Carbonaceous deposits may form on the molecular sieve material in the beds and periodically this material should be burned off. This may be advantageously done in a manner similar to that used in regenerating reforming catalysts. If desired, a third molecular sieve bed may be provided to substitute for either of the other two during regeneration.

The adsorption-desorption cycle in the process of this invention is preferably essentially isothermal. Although adsorption and desorption may be carried out at normal adsorption and desorption temperatures, it is advantageous in isothermal operation to carry the adsorption-desorption cycle out at a temperature in the range of from about 300° F. to about 600° F. This range of operation is advantageous in the during operation over about 600° F. carbon deposition rate may increase with resulting more frequent desirability or necessity for burning off carbonaceous deposits; this may increase done time. At operating temperatures under about 300° F. it becomes increasingly more difficult to purge adsorbed hydrocarbons because of the lower temperatures involved. It is preferred to operate with essentially isothermal adsorption-desorption cycle at a temperature in the range of about 500° F. to about 600° F.

Although any suitable presures may be used, it should be noted that there exists a presure drop along the bed whereby desorption or purging is carried out at a lower pressure than adsorption. This difference in pressure, of course, is inherent in the pressure drop along the sieve necessary for flow therethrough.

With reference to FIGURE II and further in accordance with this invention, I have provided a preferred embodiment wherein the pressure drop along the molecular sieve bed is accentuated. The apparatus on flow system illustrated in FIGURE II is intended to substitute for a molecular sieve bed in the process of this invention. Now more particularly with reference to the figure, a first feed consisting of a mixture of pentane and isopentane is charged through line 80 and the normal pentane is adsorbed in zone 81 while the isopentane passes on through line 82, restriction valve 83 and zone 84 and is withdrawn through line 85. Both zones 81 and 84 contain Linde Molecular Sieve 5A particles. A second feed consisting of a mixture of normal hexane and isohexanes is charged through line 85 and zone 84 wherein the normal hexane is adsorbed and the isohexanes are discharged from the zone through line 82, restriction valve 83 and zone 81. Restriction valve 83 is regulated to create a pressure drop between zone 84 and zone 81 so that as the isohexanes pass upwardly through zone 81 the pressure in the zone is reduced and stripping is thereby promoted. Normal pentane and isohexanes are recovered through line 80 and may be separated by fractionation. The decrease in pressure within zone 81 during stripping decreases the vapor pressure of adsorbed hydrocarbons and thereby increases their rate of desorption. As a new charge of pentanes is then charged to line 80, the same reduction in pressure takes place in zone 84 so that the rate of stripping of normal hexanes from zone 84 is increased. The mixture of isopentanes and normal hexane recovered through line 85 may conveniently be separated by fractionation.

The feed materials used in the process of this invention may be any two or more different feeds wherein the nonstraight-chain hydrocarbons of each feed boil in a range different from the straight-chain hydrocarbons of the other feed. Preferably the feeds are different boiling hydrocarbon feeds, i.e., boiling in different ranges. The two or more feeds may conveniently be obtained by fractionating a wider boiler hydrocarbon cut into a light fraction and a heavy fraction, such as is done in the embodiment described above with reference to FIGURE I. Other typical feeds which may be employed are mixtures of butane and isobutane, n-pentane and isopentane, n-hexane and isohexane, n-octane and isoctane, n-dodecane and isododecane, mixtures of aromatic and normal paraffinic hydrocarbons boiling in the $C_5$ to $C_6$ range, mixtures of aromatic and normal paraffinic hydrocarbons boiling in the $C_7$ to $C_{10}$ range, mixtures of saturated hydrocarbons containing straight-chain and branched-chain hydrocarbons such as mixtures of methylpentane and n-hexane, n-decane and isodecane, etc. Examples of light and heavy fractions obtained from the fractionation of wide boiling hydrocarbons are such fractions as are obtained as $C_{6-}$ fraction of a total reformate and $C_{7+}$ fraction of the same total reformate. Virgin naphthas and also isomerates may be fractionated to form the two feeds for the process of this invention. Useable feed stocks are evident to those skilled in the art from the above descriptions and such feed stocks are well known in the art.

The molecular sieve adsorbents useable therein are those normally used for the separation of straight-chain hydrocarbous from mixtures of straight-chain hydrocarbons and nonstraight-chain hydrocarbons. The molecular sieve adsorbent may be a synthetic zeolite or a natural zeolite or a combination of both. The useable natural zeolites includes those naturally occurring zeolitic materials having rigid 3- dimensional anionic networks. These may include chabazite, gmelinite, phacolite, harmotome, etc. The preferred molecular sieve materials are the synthetic molecular sieves which selectively adsorb straight-chain hydrocarbons due to their pore size. Examples of such synthetic molecular sieves are the Linde Molecular Sieve Type 4A and Type 5A. Such synthetic molecular sieves are available commercially and have pore sizes of 4 A. or 5 A. as indicated by the nomenclature of the sieve material. The Linde sieves as marketed by Linde Company, Division of Union Carbide Corp.

Generally the synthetic zeolites are synthetic crystalline partially dehydrated metallo-alumina silicates provided with pores of uniform size due to crystalline structure. The synthetic zeolites include the sodium-alumina silicates and calcium-alumina silicates. They may be prepared by heating stoichiometric quantities of alumina and silica in excess caustic under pressure. The excess caustic material is then washed out and a different metal ion may be introduced by ion exchange to form the molecular sieves of different pore sizes depending on the metal ion introduced. Molecular sieves useful in this invention are well known to the art.

It is evident from the foregoing that I have provided a process which advantageously accomplishes desorption directly with a main process stream rather than indirectly through the use of a vacuum or an extraneous purge stream. The process of this invention is advantageously operable with an essentially isothermal adsorption-desorption cycle. The desorption by stripping in accordance with this invention is distinct from the adsorptive displacement that would occur, where, normal hexane might be displaced by normal heptane in subsequent charging through a molecular sieve bed. In this invention, instead of having a different normal paraffin on the molecular sieve material in the desorption zone after the desired desorption has taken place, the molecular sieve material has merely been stripped free of the adsorbed normal paraffin. Further, the simultaneous stripping and adsorption in the separate zones of the same bed automatically takes into account the poor concentration gradient which inherently exists in adsorption and desorption from opposing ends and thereby may substantially avoid contamination of the effluent streams with unwanted components. Fractionation of the effluent streams thus becomes simpler.

I claim:

1. In a separation process or separating straight-chain hydrocarbons from a mixture of straight-chain hydrocarbons and nonstraight-chain hydrocarbons using a bed of molecular sieve adsorbent material having two opposing ends, the improvement which comprises charging a portion of a first hydrocarbon feed material containing straight-chain hydrocarbons and nonstraight-chain hydrocarbons to the adsorption bed at the first end of the bed whereby straight-chain hydrocarbons are adsorbed from said first feed on said molecular sieve material, withdrawing the nonstraight-chain hydrocarbons of said first feed from the second end of said bed, charging to the adsorption bed at the second end thereof the portion of a second hydrocarbon feed material containing straight-chain hydrocarbons and nonstraight-chain hydrocarbons, the straight-chain hydrocarbons of said second feed boiling in a range differing from the boiling range of the nonstraight-chain hydrocarbons of said first feed and the nonstraight-chain hydrocarbons of said first feed boiling in a range differing from the boiling range of the nonstraight-chain hydrocarbons of said second feed, whereby the straight-chain hydrocarbons of said second feed are adsorbed and the nonstraight-chain hydrocarbons of said second feed pass through the bed and strip adsorbed straight-chain hydrocarbons of said first feed from said bed, the charging of said first and said second feed being adjusted to adsorb in said bed a total of straight-chain hydrocarbons from said first and said second feeds in an amount less than the total adsorptive capacity of the bed for straight-chain hydrocarbons, recovering a mixture of nonstraight-chain hydrocarbons of the second feed and straight-chain hydrocarbons of the first feed from the first end of said bed as a first product mixture, charging another portion of said first feed through the bed from said first end and recovering from second end a second product mixture, separating said first product mixture into a first product of increased straight-chain hydrocarbon content and a second product of increased nonstraight-chain hydrocarbon content, and separating said second product mixture into a third product of increased straight-chain hydrocarbon content and a fourth product of increased nonstraight-chain hydrocarbon content.

2. The process of claim 1 wherein the ratios of nonstraight-chain hydrocarbons of said first feed and second feed respectively to straight-chain hydrocarbons of said first feed and said second feed respectively are at least about 3:1.

3. The process of claim 1 wherein said first feed consists essentially of a $C_{6-}$ fraction of light naphtha and total reformate and said second feed consists essentially of a $C_{7+}$ fraction of said light naphtha and total reformate mixture.

4. The process of claim 1 wherein said feeds are passed through said bed at a temperature in the range of from about 400° F. to about 600° F.

5. The process of claim 1 wherein a portion of said second product is recycled to said second feed.

6. The process of claim 1 wherein a portion of said fourth product is recycled to said first feed.

7. The process of claim 1 wherein a portion of said first product is isomerized and recycled to said first feed.

8. The process of claim 1 wherein the recited steps are also carried out in a second molecular sieve bed in such order that each bed is simultaneously being charged with a different feed and continuous operation is attained by diverting said two feeds back and forth alternatingly between both of said beds.

9. The process of claim 8 wherein said two feed materials are obtained from fractionation of a wider boiling hydrocarbon mixture.

10. The process of claim 1 which includes the additional step of reducing the pressure of the portion of molecular sieve bed being stripped relative to the portion of molecular sieve bed on which straight-chain hydrocarbons from the incoming feed are adsorbed.

11. A process for treating a mixture of light naphtha and reformate for separation of straight-chain hydrocarbons therefrom which process comprises fractionating said mixture to attain a $C_{6-}$ overhead and a $C_{7+}$ bottoms, heating said overhead and said bottoms to a temperature in the range of from about 500° F. to about 600° F., charging a portion of said overhead fraction through a first bed of molecular sieve adsorbent material whereby straight-chain hydrocarbons are adsorbed and a portion of said bottoms fraction to a second bed of molecular sieve adsorbent material whereby straight-chain hydrocarbons are adsorbed, discontinuing said chargings, then charging a second portion of said bottoms fraction through said firts bed from the opposite end thereof in an amount sufficient to provide at least three volumes of nonstraight-chain hydrocarbons per volume of overhead straight-chain hydrocarbons adsorbed on said bed, charging a second portion of said overhead fraction through said second bed from the opposite end thereof in an amount sufficient to provide at least about three volumes of nonstraight-chain hydrocarbons per volume of bottoms fraction straight-chain hydrocarbons adsorbed on said bed, whereby said first bed is stripped of overhead straight-chain hydrocarbons by the bottoms fraction nonstraight-chain hydrocarbons passing therethrough and said second bed is stripped of bottoms fraction straight-chain hydrocarbons by the overhead fraction nonstraight-chain hydrocarbons passing therethrough, the total of adsorbed straight-chain hydrocarbon from both feeds to each bed is less than the total straight-chain adsorptive capacity of each bed, fractionating the resulting mixture of overhead fraction straight-chain hydrocarbons and bottoms fraction nonstraight-chain hydrocarbons obtained from said first bed to provide a first low-boiling product substantially enriched in straight-chain hydrocarbons from overhead fraction relative to said overhead fraction and the first higher-boiling product enriched in nonstraight-chain hydrocarbons of said bottoms fraction relative to bottoms fraction, and fractionating the mixture of bottoms fraction straight-chain hydrocarbons and overhead fraction nonstraight-chain hydrocarbons withdrawn from said second bed to provide a second low-boiling product, enriched in nonstraight-chain hydrocarbons from said overhead fraction relative to said overhead fraction and a second high-boiling product enriched in bottoms fraction straight-chain hydrocarbons relative to said bottoms fraction.

12. The process of claim 11 wherein both said first bed and said second bed of molecular sieve adsorbent material each comprise two zones in single pressure restrictive series flow communication in either direction whereby said pressure restrictive flow provides a pressure drop of the nonstraight-chain hydrocarbon flowing from one zone to the other zone.

References Cited by the Examiner
UNITED STATES PATENTS

| | | | |
|---|---|---|---|
| 2,935,467 | 5/1960 | Fleck et al. | 260—676 |
| 2,950,336 | 8/1960 | Kimberlin et al. | 260—676 |
| 2,996,558 | 8/1961 | Feldbauer | 260—676 |

DELBERT E. GANTZ, *Primary Examiner.*

ALPHONSO D. SULLIVAN, *Examiner.*